US008198852B2

(12) United States Patent
Aono et al.

(10) Patent No.: US 8,198,852 B2
(45) Date of Patent: Jun. 12, 2012

(54) DRIVE CONTROL CIRCUIT FOR POLYPHASE MOTOR CAPABLE OF REDUCING VARIATION AMONG ARMATURE CURRENTS OF RESPECTIVE PHASES, AND SPINDLE APPARATUS USING THE SAME

(75) Inventors: Kazuyuki Aono, Iwata (JP); Akio Nakajima, Iwata (JP)

(73) Assignee: NTN Corporation, Osaka (JP)

( * ) Notice: Subject to any disclaimer, the term of this patent is extended or adjusted under 35 U.S.C. 154(b) by 552 days.

(21) Appl. No.: 12/153,930

(22) Filed: May 28, 2008

(65) Prior Publication Data

US 2008/0297095 A1 Dec. 4, 2008

(30) Foreign Application Priority Data

Jun. 4, 2007 (JP) ................................. 2007-148152

(51) Int. Cl.
G05F 1/10 (2006.01)
(52) U.S. Cl. ......... 318/650; 318/619; 318/496; 318/538
(58) Field of Classification Search ............... 318/400.4, 318/714, 715, 722, 430, 433, 434, 437, 442, 318/474, 490, 400.2, 400.26, 400.27, 496, 318/504, 538, 619, 650, 678
See application file for complete search history.

(56) References Cited

U.S. PATENT DOCUMENTS

| | | | | |
|---|---|---|---|---|
| 4,633,150 A | * | 12/1986 | Inaji et al. ................. | 318/400.04 |
| 4,772,830 A | * | 9/1988 | Kobari et al. .................. | 318/563 |
| 5,059,878 A | * | 10/1991 | Bardelang et al. ............ | 318/490 |
| 5,777,447 A | * | 7/1998 | Okano .......................... | 318/434 |
| 5,969,490 A | * | 10/1999 | Gotou ...................... | 318/400.04 |
| 6,194,856 B1 | * | 2/2001 | Kobayashi et al. ........... | 318/432 |
| 6,291,961 B1 | * | 9/2001 | Gotou ............................ | 318/599 |
| 7,002,308 B2 | * | 2/2006 | Kinukawa et al. ....... | 318/400.04 |
| 7,180,258 B2 | * | 2/2007 | Specht et al. ................. | 318/432 |
| 7,280,308 B2 | * | 10/2007 | Kokami ..................... | 360/78.04 |
| 7,394,214 B2 | * | 7/2008 | Endo et al. .................... | 318/432 |
| 7,504,797 B2 | * | 3/2009 | Tomigashi et al. ........... | 318/807 |
| 7,786,688 B2 | * | 8/2010 | Hayashi et al. .......... | 318/400.29 |

FOREIGN PATENT DOCUMENTS

JP 5-022971 1/1993

(Continued)

OTHER PUBLICATIONS

Japanese Office Action, and English translation thereof, issued in Japanese Patent Application No. 2007-148152 dated Apr. 24, 2012.

*Primary Examiner* — Walter Benson
*Assistant Examiner* — Thai Dinh
(74) *Attorney, Agent, or Firm* — McDermott Will & Emery LLP

(57) ABSTRACT

Even when there is some degree of variation in the characteristics among components constituting a polyphase motor and a driving circuit therefor, current control signals of respective phases being input to the drive circuit have their amplitude finely adjusted by an amplitude control circuit, so that amplitude is uniform among armature currents of respective phases that are ultimately output from the drive circuit. The amplitude adjusting circuit is configured by gain variable amplifiers, for example. Thus, rotation fluctuation and vibration of the polyphase motor can be reduced.

5 Claims, 5 Drawing Sheets

FOREIGN PATENT DOCUMENTS

| | | |
|---|---|---|
| JP | 5-091780 | 4/1993 |
| JP | 10-191677 | 7/1998 |
| JP | 10-239102 | 9/1998 |
| JP | 2000-118424 | 4/2000 |
| JP | 2001-145383 | 5/2001 |
| JP | 2002-078374 | 3/2002 |
| JP | 2007-074816 | 3/2007 |
| JP | 2007-129831 | 5/2007 |

* cited by examiner

DRIVE CONTROL CIRCUIT FOR POLYPHASE MOTOR CAPABLE OF REDUCING VARIATION AMONG ARMATURE CURRENTS OF RESPECTIVE PHASES, AND SPINDLE APPARATUS USING THE SAME

BACKGROUND OF THE INVENTION

1. Field of the Invention

The present invention relates to rotation control of a polyphase motor.

2. Description of the Background Art

A servo motor is used for high-precision rotation control and position control as a spindle motor used for audio devices and computer peripheral equipment (for example, see FIG. 3 of Japanese Patent Laying-Open No. 2007-074816). FIG. 5 is a block diagram schematically showing a configuration of a conventional spindle apparatus. In the following, referring to FIG. 5, the configuration of the conventional spindle apparatus is described.

In FIG. 5, the spindle apparatus is configured by a spindle motor 131 and a drive control circuit 132 therefor. Spindle motor 131 includes a motor body 133 being a three-phase brushless motor, an encoder 134 fixed to the spindle shaft of motor body 133, and the like. Encoder 134 detects the rotation speed, rotor position and the like of motor body 133, and feeds back a detection signal to drive control circuit 132.

Drive control circuit 132 in FIG. 5 includes a control computer 141 and drive circuit 142. In response to a current command value provided by control computer 141, drive circuit 142 outputs armature currents of three-phase sine waves of U, V, W phases passing through armature windings of motor body 133. When motor body 133 is driven by pulse width modulation (PWM), drive circuit 142 is configured by three-phase inverter circuitry. The U- and W-phase armature currents are detected by current detectors 137a, 137b and digitally converted by A/D converters 138a, 138b, respectively, and thereafter provided as feedback signals to control computer 141. Here, the V-phase armature current can be determined based on that the sum of U, V, W phases is 0. It is to be noted that, while control computer 141 is used in drive control circuit 132 in FIG. 5, the equivalent function can be configured using analog circuitry.

For the control of a spindle motor for which particularly high-precision rotation speed control is required, such as a spindle motor used in manufacture/inspection processes of magnetic disks and optical disks or in precision processing machines and precision inspection devices, PLL (Phase Lock Loop) control is employed (for example, see Japanese Patent Laying-Open No. 2002-078374). In the spindle device of PLL control, a reference pulse signal generated by a crystal oscillator or the like and a pulse signal corresponding to the rotation speed of a motor body detected by an encoder are compared with each other to obtain the phase difference, whereby a current command value is determined.

In the above-described use, capability of driving at a constant speed for a certain period is important as a basic performance of the spindle motor. In particular, as to the driving at a constant speed, it is required that rotation fluctuation, vibration and noise are small.

One cause of the rotation fluctuation and vibration may be that, in a three-phase motor, the amplitudes of sine waves passing through the U-, V-, and W-phase armature windings are varied and not uniform. When there is variation in the amplitude among the armature currents of respective phases, ripple occurs in the torque of the motor, and therefore the motor vibrates. The number of such vibration is proportional to the number of poles of the rotor. The vibration caused by variation in the amplitude among the armature currents of respective phases may occur not only in the three-phase motor, but in any polyphase motor.

Such variation in the amplitude among the armature currents of respective phases is considered to be caused by variation in the winding resistance among the armature windings of the motor body, variation in the characteristics among power devices used in the drive circuit and the like. When the control circuit for the motor is configured by analog circuitry, the cause may be variation in the characteristics of operational amplifiers, resistors and the like. In particular, in a case of a servo motor that performs feedback control, variations in the characteristics of elements used in the drive control circuit may leave offset and phase shift between a current command value and an actual armature current after a steady state is entered.

Current scheme for reducing variation among the armature currents of respective phases is to select resistors, operation amplifiers, power devices and the like used in the drive control circuit for the motor so that variation among them is small. As to the motor body also, the one in which variation in winding resistance is small is selected. Accordingly, a plurality of these components must be prepared, whereby extra costs and trouble are required.

SUMMARY OF THE INVENTION

An object of the present invention is to provide a drive control circuit capable of reducing variation among armature currents of respective phases of a polyphase motor, thereby reducing rotation fluctuation and vibration of the polyphase motor.

In summary, the present invention is directed to a drive control circuit driving and controlling a polyphase motor including a current control circuit, an amplitude adjusting circuit, and a drive circuit. The current control signal outputs, in response to a current command value being a target value of amplitude of each of armature currents passing through the polyphase motor, current control signals corresponding to respective phases of the polyphase motor. The amplitude adjusting circuit adjusts amplitude of the current control signals for reducing variation in the amplitude among the armature currents of respective phases. The drive circuit outputs, in response to an output of the amplitude adjusting circuit, the armature currents passing through respective phases of the polyphase motor.

Preferably, the drive control circuit of the present invention further includes current detectors detecting the armature currents of the polyphase motor. In this case, the current control circuit outputs the current control signals of respective phases, based on current detection values detected by the current detectors and the current command value.

Further preferably, the current detectors are provided for respective phases of the polyphase motor. In this case, the current control circuit outputs the current control signals of respective phases, based on the current detection values detected by the current detectors of corresponding phases.

Still further preferably, the amplitude adjusting circuit includes an amplifier with variable gain.

Still further preferably, a rotation position detector detecting a rotation position of a rotor of the polyphase motor is provided to a rotation shaft of the polyphase motor. In this case, the current command value is determined by phase lock loop control using an output signal of the rotation position detector.

According to another aspect of the present invention, the present invention is directed to a spindle motor including a polyphase motor, a bearing supporting a rotation shaft of the polyphase motor; and a drive control circuit driving and controlling the polyphase motor. The drive control circuit includes a current control circuit, an amplitude adjusting circuit, and a drive circuit. The current control circuit outputs, in response to a current command value being a target value of amplitude of each of armature currents passing through the polyphase motor, current control signals corresponding to respective phases of the polyphase motor. The amplitude adjusting circuit adjusts amplitude of the current control signals for reducing variation in the amplitude among the armature currents of respective phases. The drive circuit outputs, in response to an output of the amplitude adjusting circuit, the armature currents passing through respective phases of the polyphase motor.

According to the present invention, even when there is some degree of variation in the characteristics among the components of the drive control circuit and in the resistance among armature windings of the polyphase motor, variation among ultimate armature currents of respective phases can be reduced by adjusting the amplitude of current control signals by the amplitude adjusting circuit. Accordingly, the primary advantage of the present invention is that high-precision rotation control in which rotation fluctuation and vibration of the polyphase motor are suppressed can be performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
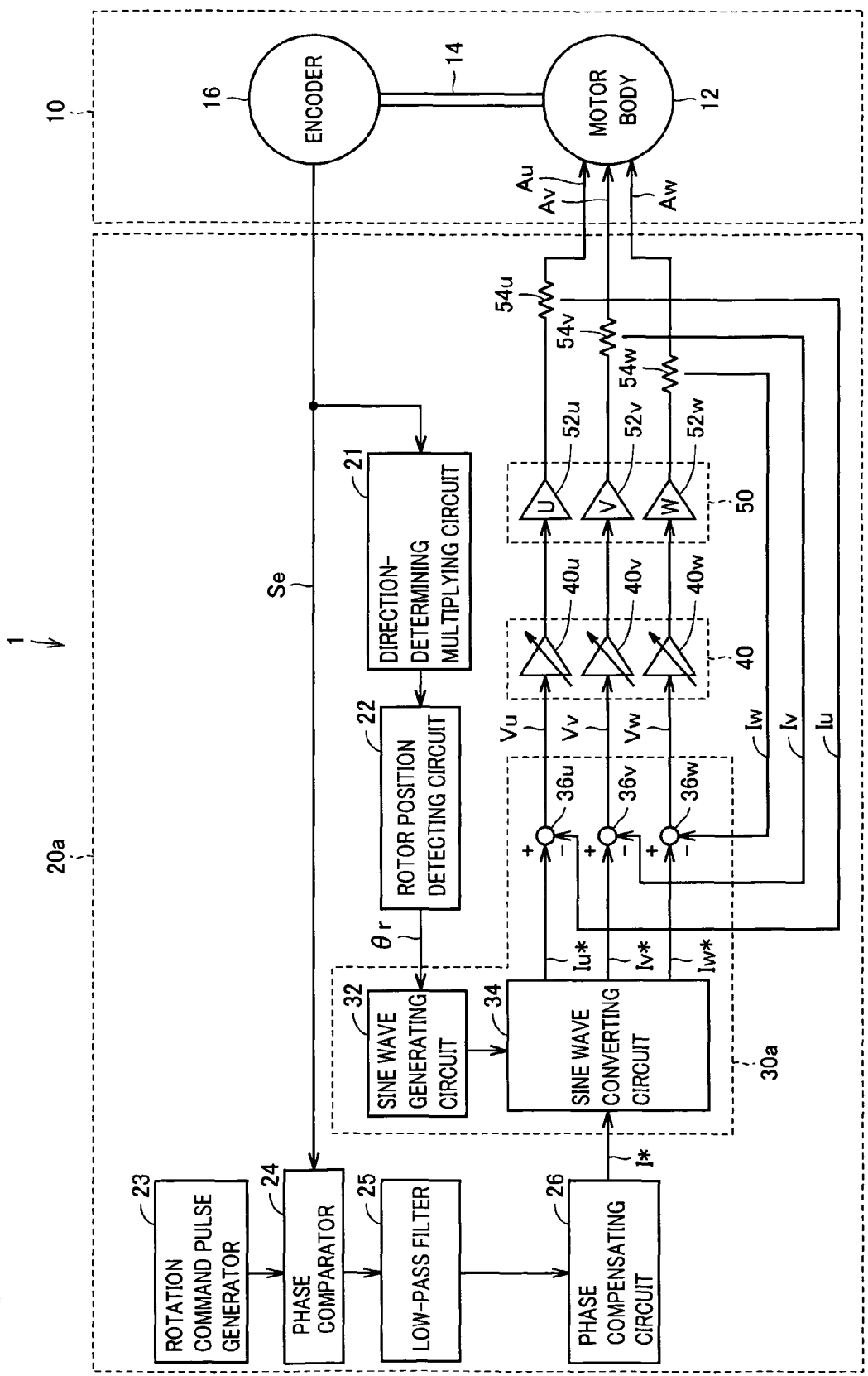
FIG. 1 is a block diagram showing a configuration of a spindle apparatus 1 of a first embodiment of the present invention.

In the following, embodiments of the present invention are described referring to the drawings. The identical or corresponding parts are denoted by the same reference characters, and description thereof is not repeated.

First Embodiment

FIG. 1 is a block diagram showing a configuration of a spindle apparatus 1 of a first embodiment of the present invention. As shown in FIG. 1, spindle apparatus 1 includes a spindle motor 10, and a drive control circuit 20a that drives and controls spindle motor 10.

Spindle motor 10 includes a motor body 12, a spindle shaft 14 being the rotation shaft of motor body 12, and an encoder 16 fixed to spindle shaft 14. Motor body 12 in FIG. 1 is shown as a three-phase motor, as one exemplary polyphase motor of the present invention. The polyphase motors to which the present invention is applicable include brushless motors, synchronous motors, induction motors and the like.

Spindle shaft 14 is supported by bearings. When high rotation precision is required, as in a case of precision processing machines or precision inspection devices, spindle shaft 14 is supported in a noncontact manner using aerostatic bearings, so that friction resistance becomes substantially 0. Encoder 16 is for detecting the rotation position of the rotor of motor body 12, and it corresponds to a rotation position detector in the present invention. Encoder 16 outputs a pulse signal proportional to the rotation frequency of the motor as an encoder signal Se. The output encoder signal Se is used in drive control circuit 20a for feedback control.

Drive control circuit 20a is for driving and controlling spindle motor 10, and configured to include a drive circuit 50 driving motor body 12, a current control circuit 30a generating current control signals Vu, Vv, Vw, an amplitude adjusting circuit 40 adjusting the amplitudes of current control signals Vu, Vv, Vw, circuits 21, 22 for detecting the rotation position of the rotor of motor body 12, circuits 23, 24, 25, 26 for PLL controlling the rotation speed of motor body 12, and the like.

Furthermore, to the output side of drive circuit 50, current detectors 54u, 54v, 54w for detecting armature currents Au, Av, Aw of respective U, V, W phases output from drive circuit 50 are provided for respective phases. As current detectors 54u, 54v, 54w, detection resistors are used, for example. The voltage across the detection resistor is measured by an isolated amplifier. Current detection values Iu, Iv, Iw detected by current detectors 54u, 54v, 54w are input as feedback information to current control circuit 30a.

In the following, elements constituting drive control circuit 20a are described in order, starting with encoder signal Se detected by encoder 16, and along the flow of the signal. Encoder signal Se is firstly split into two. One is input to a direction-determining multiplying circuit 21, and the other is input to a phase comparator 24 that is a circuit for PLL control. Accordingly, first, the flow of encoder signal Se being input to direction-determining multiplying circuit 21 is described.

Direction-determining multiplying circuit 21 detects the rotation direction of the rotor constituting motor body 12, based on input encoder signal Se. For example, in a case of an incremental encoder, encoder signals Se of two phases, which are out of phase with each other by 90°, is output. By determining which of the phases precedes, the rotation direction of the rotor can be determined. Further, direction-determining multiplying circuit 21 performs multiplication in which the number of pulses of encoder signal Se is electrically increased. Multiplication is performed for improving the detection precision of the rotor position in next rotor position detecting circuit 22.

Encoder signal Se multiplied by direction-determining multiplying circuit 21 is input to rotor position detecting circuit 22. Rotor position detecting circuit 22 detects a rotation angle θr from the reference position of the rotor of motor body 12 based on the input encoder signal Se. When an incremental encoder is used, rotor position detecting circuit 22 counts the number of pulses from the reference pulse corresponding to the reference position, thereby determining rotation angle θr. The detected rotation angle θr of the rotor is input to current control circuit 30a.

Current control circuit 30a includes, in the present embodiment, a sine wave generating circuit 32, a sine wave converting circuit 34, and subtractors 36u, 36v, 36w for respective U, V, W phases. Sine wave generating circuit 32 receives rotor rotation angle θr (unit: degree) detected by rotor position detecting circuit 22 described above, and generates a sine wave signal corresponding to rotor rotation angle θr. For example, if the pole-pair number of the rotor is p, electrical angle for rotor rotation angle θr (unit: degree) is p·θr. Therefore, sin (p·θr) is generated as a sine wave signal.

Sine wave converting circuit 34 multiplies sine wave signal sin (p·θr) received from sine wave generating circuit 32 by a current command value I* that is a target value of the amplitude of each of the armature currents and that is generated by a phase compensating circuit 26 for PLL control, which will be described later, and outputs current command values Iu*, Iv*, Iw* of respective U, V, W phases. Here, by the rotation direction of the rotor determined by direction-determining multiplying circuit 21, one of current command values Iv*, Iw* of V, W phases has its phase advanced by 120° relative to that of current command value Iu* of U phase, and the other has its phase lagged by 120° relative to that of current command value Iu* of U phase.

Subtractors 36u, 36v, 36w provided for respective U, V, W phases subtract current detection values Iu, Iv, Iw detected by current detectors 54u, 54v, 54w of corresponding phases from current command values Iu*, Iv*, Iw* of respective phases generated by sine wave converting circuit 34. The subtraction result is output as current control signals Vu, Vv, Vw provided to drive circuit 50.

Amplitude adjusting circuit 40 is for individually and finely adjusting current control signals Vu, Vv, Vw of respective U, V, W phases. For example, amplifiers 40u, 40v, 40w with variable gain may be provided for respective phases and used as amplitude adjusting circuit 40.

Figure 2:
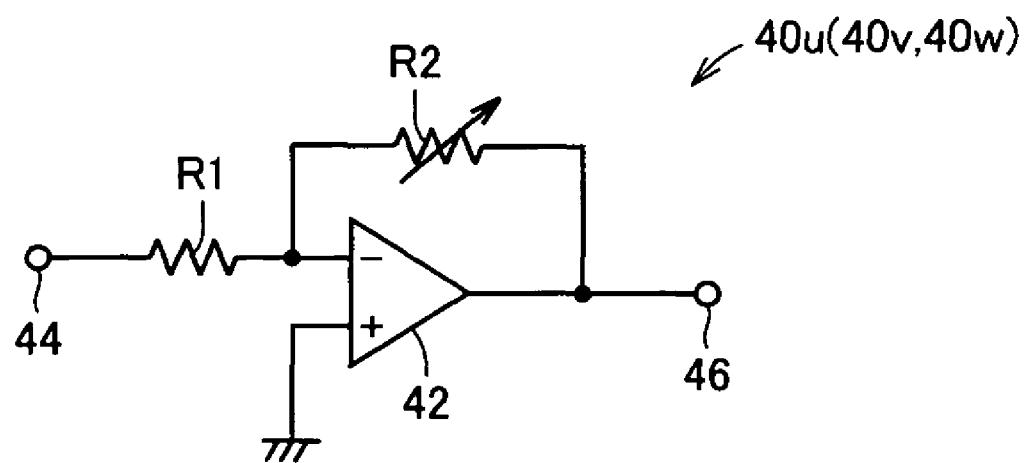
FIG. 2 is a circuit diagram showing a configuration of each gain variable amplifier as one example of an amplitude adjusting circuit 40 shown in FIG. 1.

FIG. 2 is a circuit diagram showing a configuration of each gain variable amplifier 40u, 40v, 40w as one example of amplitude adjusting circuit 40. As shown in FIG. 2, each gain variable amplifier 40u, 40v, 40w can be formed by, for example, an operational amplifier 42, a resistor R1, and a variable resistor R2. The variable range of gain is set to 0.8 to 1.2 so as to fully satisfy the object of finely adjusting the amplitude of each current control signal Vu, Vv, Vw being input from input terminal 44. Each current control signal Vu, Vv, Vw having its amplitude adjusted is output from output terminal 46 to drive circuit 50.

Referring to FIG. 1 again, in response to the input current control signals Vu, Vv, Vw, drive circuit 50 generates armature currents Au, Av, Aw passing through armature windings of motor body 12. In the present embodiment, drive circuit 50 is configured by power amplifiers 52u, 52v, 52w provided for respective phases, and amplifies and outputs the received current control signals Vu, Vv, Vw of respective phases. In order to minimize variation among armature currents Au, Av, Aw of respective phases, it is preferable that power amplifiers 52u, 52v, 52w of respective phases having substantially equal gain are employed. When particularly high output is required, drive circuit 50 may be configured by inverter circuitry, so that armature currents Au, Av, Aw having their pulse width modulated are output.

Next, in drive control circuit 20a in FIG. 1, a rotation command pulse generator 23, a phase comparator 24, a low-pass filter 25, and a phase compensating circuit 26, which are related to PLL control, are described. PLL control enables rotation speed control of high precision by synchronizing the rotation of the motor with the frequency of the reference pulse signal.

In FIG. 1, rotation command pulse generator 23 outputs a reference pulse signal for PLL control to phase comparator 24, and may be configured using a quartz oscillator, for example.

Phase comparator 24 compares encoder signal Se received from encoder 16 and the reference pulse signal received from rotation command pulse generator 23, and outputs a pulse signal having the width equal to the time between the rising edge of encoder signal Se and that of the reference pulse signal, as a phase difference signal to low-pass filter 25.

Low-pass filter 25 averages and outputs the received phase difference signal to phase compensator circuit 26.

Phase compensating circuit 26 outputs a current command value I* corresponding to the magnitude of the phase difference signal to the above-described sine wave converting circuit 34. For example, when the phase of encoder signal Se is advanced relative to that of the reference pulse signal, by reducing the magnitude of current command value I* output from phase compensating circuit 26, the rotation speed of the motor is controlled to be constant.

Figure 3:
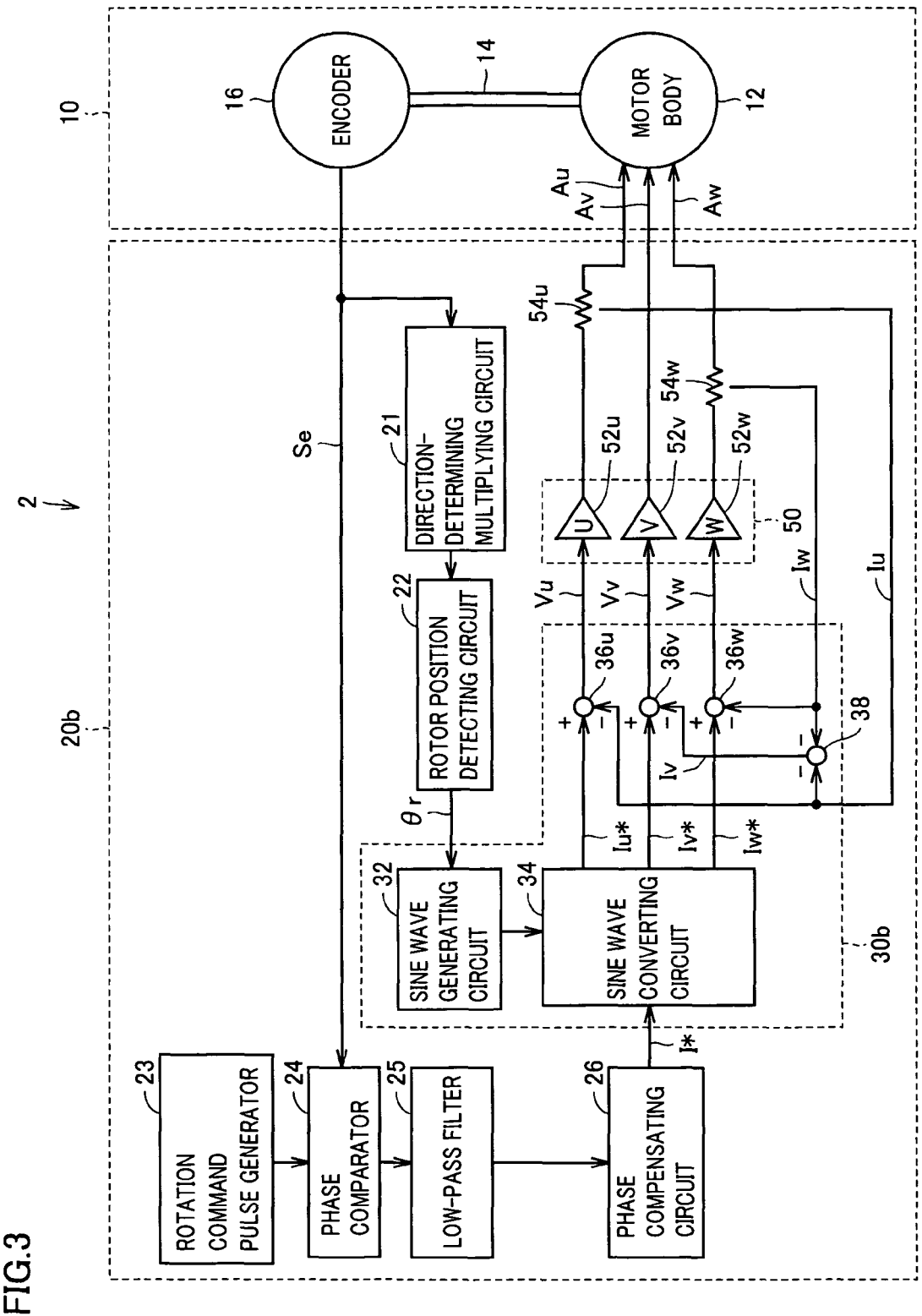
FIG. 3 is a block diagram showing a configuration of a spindle apparatus 2 of a comparative example as contrasted with spindle apparatus 1 in FIG. 1.

Next, the effect of spindle apparatus 1 of the first embodiment is described in comparison with a spindle apparatus 2 of a comparative example. FIG. 3 is a block diagram showing a configuration of spindle apparatus 2 of the comparative example as contrasted with spindle apparatus 1 in FIG. 1. Spindle apparatus 2 of the comparative example shown in FIG. 3 is different from spindle apparatus 1 of the present invention in that amplitude adjusting circuit 40 is not provided and current detectors are provided for only two phases of U and W phases. Since the armature current of V phase can be obtained based on that the sum of armature currents of U, V, W phases is 0, often only the armature currents of two phases are detected so that the apparatus configuration is simplified. As a result, the configuration of current control circuit 30b is also different from that of spindle apparatus 1 shown in FIG. 1. In current control circuit 30b in FIG. 3, U- and W-phase current command values Iu, Iw having their signs inverted are added by an adder 38, and thereafter subtracted by subtractor 36v from V-phase current command value Iv*, whereby V-phase current control signal Vv is obtained.

As is clearly seen from the comparison between FIG. 1 and FIG. 3, the first feature of the first embodiment of the present invention is that amplitude adjusting circuit 40 adjusting the amplitude of current control signals Vu, Vv, Vw being input to drive circuit 50 is provided. With this, even when there is some degree of variation in winding resistance among the armature windings of motor body 12, or in the characteristics among the elements such as amplifiers or resistors used in drive control circuit 20a, it is possible to adjust armature currents Au, Av, Aw of motor body 12 so that the amplitude is uniform among them. As a result, a spindle apparatus with small rotation fluctuation and low vibration can be implemented.

In particular, in a case of an apparatus that is capable of performing high-precision rotation control such as an aerostatic bearing spindle apparatus using PLL control, a slight amount of variation in the element characteristics tends to be apparent as rotation fluctuation. Accordingly, by combining with amplitude adjusting circuit 40 according to the present invention, the rotation speed fluctuation can further be improved and a higher-precision spindle apparatus can be implemented.

Furthermore, in spindle apparatus 2 shown in FIG. 3, it is necessary to select motor body 12 and the elements such as amplifiers or resistors used in drive control circuit 20b that are less varied. On the other hand, according to the present invention, variation in the characteristics among the components can be tolerated by a certain degree, by adjustment using amplitude adjusting circuit 40. Therefore, such a trouble of selection is saved. Furthermore, amplitude adjusting circuit 40 can be implemented at low costs, for example by a simple circuit configuration such as a gain variable amplifier shown in FIG. 2.

The second feature of the first embodiment of the present invention is that, when armature currents Au, Av, Aw are feedback-controlled, armature currents Au, Av, Aw of respective U, V, W phases are individually detected by current detectors 54u, 54v, 54w provided for respective phases, and the detected current detection values Iu, Iv, Iw of respective phases are fed back for current command values Iu*, Iv*, Iw* of corresponding phases. In the comparative example shown in FIG. 3, when V-phase current detection value Iv is generated by an operation based on U-phase current detection value Iu and W-phase current detection value Iw, variation in the amplitude among armature currents Au, Aw or effects of disturbance and noises in U and W phases also appear in V phase. Therefore, in the comparative example shown in FIG. 3, the amplitude in V phase more greatly deviates from current command value I* than in U and W phases.

Additionally, when amplitude adjustment is performed using amplitude adjustment control circuit 40 as in the present invention, the circuit configuration shown in FIG. 3 cannot achieve amplitude adjustment easily, since the results of the amplitude adjustment for respective phases affect each other. In contrast, by individually feeding back U-, V-, and W-armature currents Au, Av, Aw as in the present invention, high-precision rotation control without rotation fluctuation is realized. Additionally, amplitude adjustment of armature currents Au, Av, Aw using amplitude adjusting circuit 40 becomes easier also.

It is to be noted that, while amplitude adjusting circuit 40 is provided for each of U, V, and W phases, the object of the present invention can be achieved when amplitude adjusting circuit 40 is provided for any two of the phases, since the amplitudes of armature currents Au, Av, Aw of respective phases can relatively be adjusted to be uniform.

Current control circuit 30a, as well as phase comparator 24, low-pass filter 25 and phase compensating circuit 26 used for PLL control can also be realized by digital signal processing using a microcomputer.

Furthermore, while amplitude adjusting circuit 40 that is the first feature of the present invention exerts its effect when high-precision rotation control such as a servo motor is performed, the present invention is also applicable to a device other than a servo motor.

Second Embodiment

Figure 4:
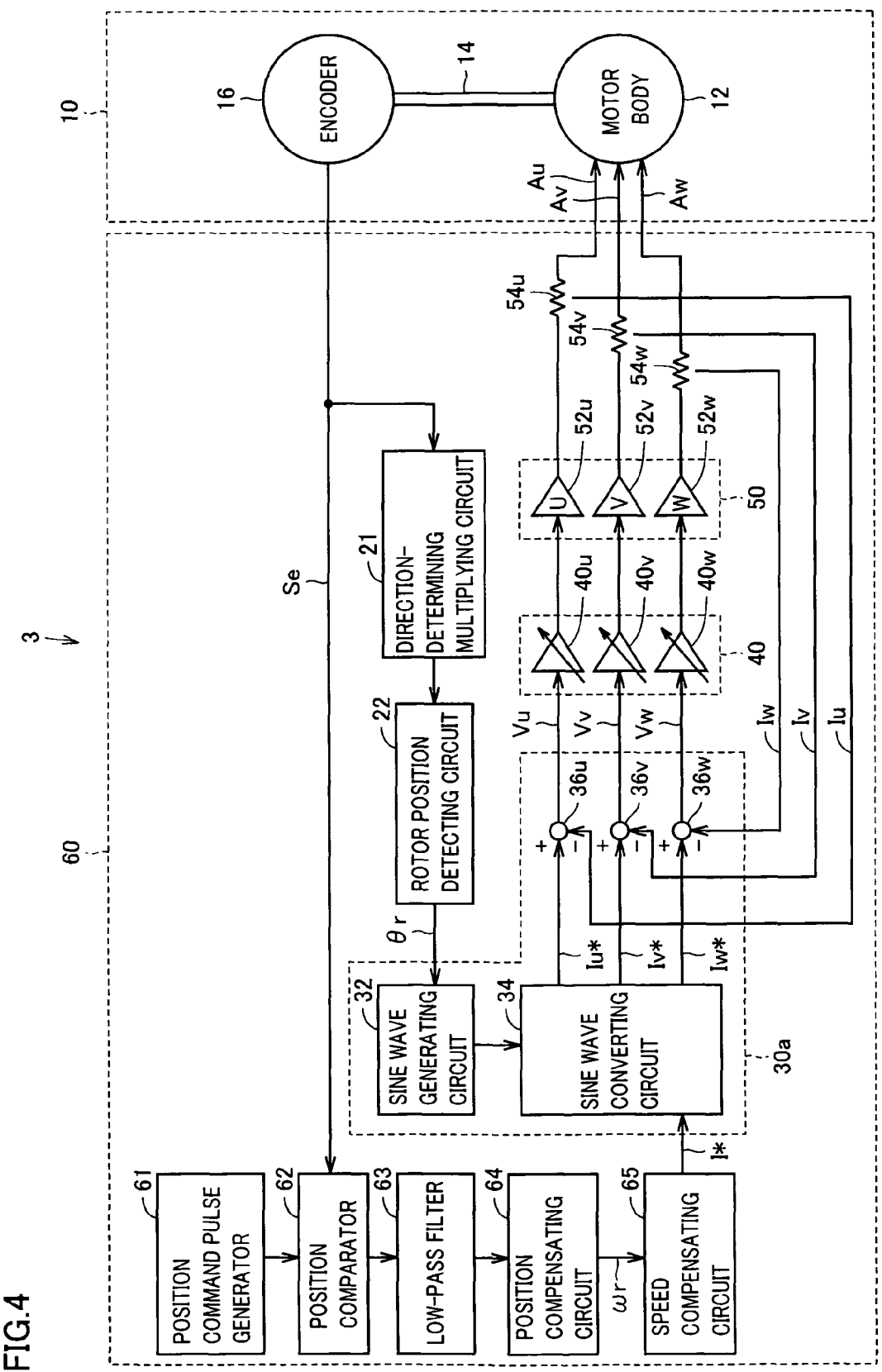
FIG. 4 is a block diagram showing a configuration of a spindle apparatus 3 of a second embodiment of the present invention.
Figure 5:
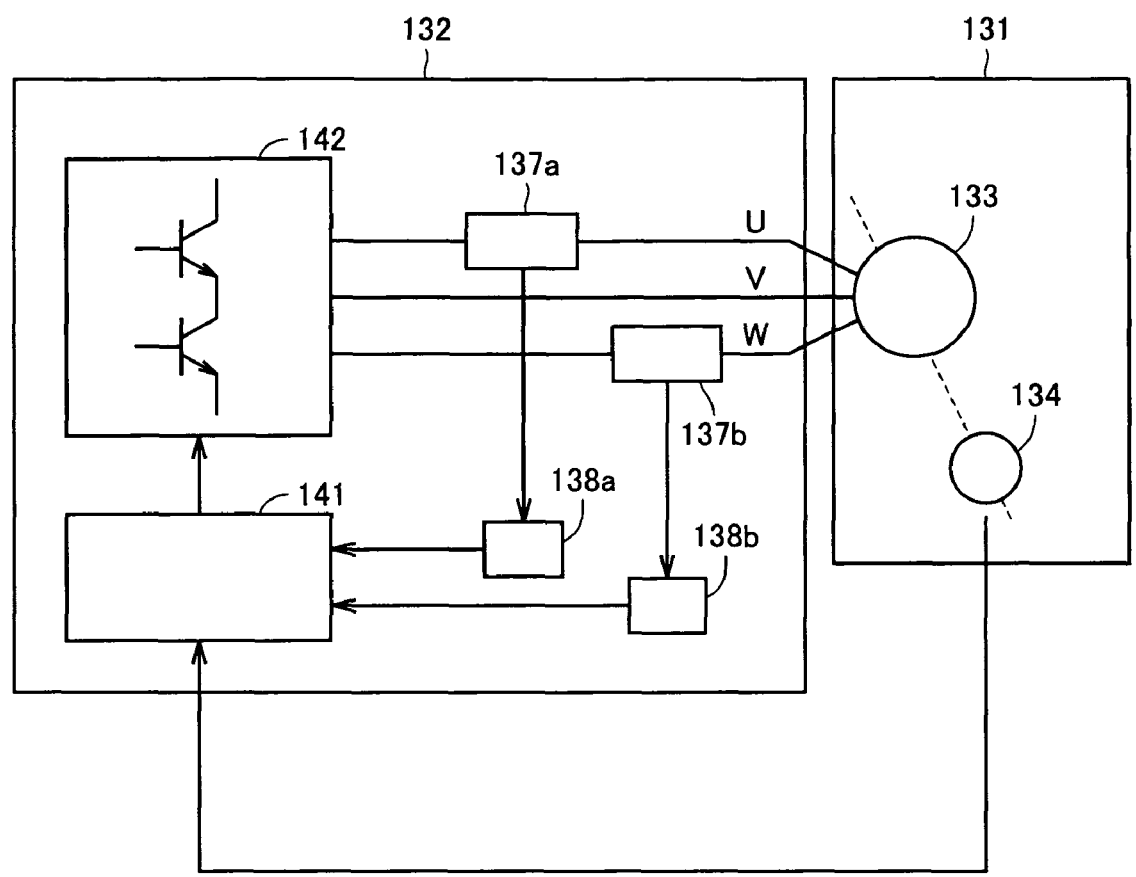
FIG. 5 is a block diagram schematically showing a configuration of a conventional spindle apparatus.

FIG. 4 is a block diagram showing a configuration of a spindle apparatus 3 of a second embodiment of the present invention. Spindle apparatus 3 shown in FIG. 4 performs position control using spindle motor 10, and for example, used as a motor for an actuator. Spindle apparatus 3 includes, similarly to the first embodiment shown in FIG. 1, spindle motor 10 and drive control circuit 60 therefor. It is different from the first embodiment of FIG. 1 in that, while in FIG. 1, rotation command pulse generator 23, phase comparator 24, low-pass filter 25 and phase compensating circuit 26 are used for PLL control, in FIG. 4, a position command pulse generator 61, a position comparator 62, a low-pass filter 63, a position compensating circuit 64, and a speed compensating circuit 65 are used instead.

In FIG. 4, position command pulse generator 61 provides position comparator 62 with a position command as a digital signal by the number of pulses. Position comparator 62 generates deviation between the position command pulse signal and encoder signal Se as a deviation signal. The deviation signal is input to low-pass filter 63 and ripple is removed therefrom. Thereafter, the deviation signal is input to position compensating circuit 64. In position compensating circuit 64, a speed command value ωr that is a target value of the rotation speed of the rotor is generated based on the deviation signal. The generated speed command value ωr is input to speed compensating circuit 65. Speed compensating circuit 65 outputs current command value I* based on speed command value ωr to current control circuit 30a. With spindle apparatus 3 for position control having such a configuration also, similarly to spindle apparatus 1 of the first embodiment, it is possible to adjust armature currents Au, Av, Aw so that the amplitude is uniform among them. As a result, rotation fluctuation can be reduced and spindle motor 10 can be rotated smoothly.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A drive control circuit driving and controlling a polyphase motor, comprising:
    a current control circuit configured to generate current control signals based on current command values, each current command value being a target value of amplitude of each of armature currents passing through said polyphase motor, and output said current control signals corresponding to respective phases of said polyphase motor;
    an amplitude adjusting circuit configured to receive said current control signals output from said current control circuit, adjust amplitude of said current control signals for reducing variation in the amplitude among said armature currents of respective phases and, output the adjusted current control signals corresponding to respective phases of said polyphase motor; and
    a drive circuit configured to output, in response to the adjusted current control signals from said amplitude adjusting circuit, said armature currents passing through respective phases of said polyphase motor, wherein
    the amplitude adjusting circuit includes gain-variable amplifiers for said respective current control signals to adjust gain of each amplifier to reduce variation in the amplitude among said armature currents of the respective phases.

2. The drive control circuit according to claim 1, further comprising
    current detectors detecting the armature currents of said polyphase motor, wherein
    said current control circuit outputs said current control signals of respective phases, based on current detection values detected by said current detectors and said current command value.

3. The drive control circuit according to claim 2, wherein
    said current detectors are provided for respective phases of said polyphase motor, and
    said current control circuit outputs said current control signals of respective phases, based on the current detection values detected by said current detectors of corresponding phases.

4. The drive control circuit according to claim 1, wherein
a rotation position detector detecting a rotation position of a rotor of said polyphase motor is provided to a rotation shaft of said polyphase motor, and
said current command value is determined by phase lock loop control using an output signal of said rotation position detector.

5. A spindle motor, comprising:
a polyphase motor;
a bearing supporting a rotation shaft of said polyphase motor; and
a drive control circuit driving and controlling said polyphase motor, wherein said drive control circuit includes
   a current control circuit configured to generate current control signals based on current command values, each current command value being a target value of amplitude of each of armature currents passing through said polyphase motor, and output said current control signals corresponding to respective phases of said polyphase motor;
   an amplitude adjusting circuit configured to receive said current control signals output from said current control circuit, adjust amplitude of said current control signals for reducing variation in the amplitude among said armature currents of respective phases and, output the adjusted current control signals corresponding to respective phases of said polyphase motor; and
   a drive circuit configured to output, in response to the adjusted current control signals from said amplitude adjusting circuit, said armature currents passing through respective phases of said polyphase motor, wherein
the amplitude adjusting circuit includes gain-variable amplifiers for said respective current control signals to adjust gain of each amplifier to reduce variation in the amplitude among said armature currents of the respective phases.

* * * * *